United States Patent
Woo

(10) Patent No.: US 8,021,774 B2
(45) Date of Patent: Sep. 20, 2011

(54) SECONDARY BATTERY AND METHOD OF FABRICATING THE SAME

(75) Inventor: Soonki Woo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 11/690,753

(22) Filed: Mar. 23, 2007

(65) Prior Publication Data
US 2007/0224491 A1   Sep. 27, 2007

(30) Foreign Application Priority Data
Mar. 27, 2006   (KR) ................. 10-2006-0027521

(51) Int. Cl.
*H01M 2/36* (2006.01)
*H01M 2/08* (2006.01)
(52) U.S. Cl. ............... 429/72; 429/174; 29/623.1
(58) Field of Classification Search .......... None
See application file for complete search history.

(56) References Cited

U.S. PATENT DOCUMENTS

| | | | |
|---|---|---|---|
| 6,190,798 B1 * | 2/2001 | Okada et al. | 429/163 |
| 6,455,193 B1 * | 9/2002 | Miyazaki et al. | 429/185 |
| 6,761,996 B1 | 7/2004 | Kim et al. | |
| 7,320,846 B2 * | 1/2008 | Watanabe et al. | 429/210 |
| 2004/0115521 A1 | 6/2004 | Cho | |
| 2005/0164079 A1 | 7/2005 | Kim | |
| 2005/0221176 A1 * | 10/2005 | Kim | 429/175 |

FOREIGN PATENT DOCUMENTS

| | | |
|---|---|---|
| CN | 1495933 A * | 5/2004 |
| JP | 58-88774 | 6/1983 |
| JP | 01-119162 | 8/1989 |
| JP | 02-090455 | 3/1990 |
| JP | 2000-021437 | 1/2000 |
| JP | 2000-106156 | 4/2000 |
| JP | 2000-215883 | 8/2000 |
| JP | 2001-313022 | 11/2001 |
| JP | 2002-298832 | 10/2002 |
| JP | 2004-103579 | 4/2004 |
| KR | 10-2000-0051285 A | 8/2000 |
| KR | 10-2006-0037839 A | 5/2006 |
| KR | 10-0686857 B1 | 2/2007 |

(Continued)

OTHER PUBLICATIONS

SIPO Office action dated Jun. 27, 2008, for corresponding Chinese Patent application 200710086956.8, noting listed Chinese reference in this IDS, as well as U.S. Patent 6,190,798.

(Continued)

*Primary Examiner* — Barbara L. Gilliam
*Assistant Examiner* — Angela J. Martin
(74) *Attorney, Agent, or Firm* — Christie, Parker & Hale, LLP

(57) ABSTRACT

A secondary battery includes an electrode assembly and a can having an opening at one end of the can. The electrode assembly is housed in the can. A cap plate seals the opening. The cap plate includes an electrolyte injection hole. An electrode terminal is coupled to the cap plate electrical connecting the electrode terminal and the electrode assembly. A gasket is located between the electrode terminal and the cap plate to insulate the electrode terminal from the cap plate. A plug seals the electrolyte injection hole, the plug being coated with an elastic film.

16 Claims, 8 Drawing Sheets

FOREIGN PATENT DOCUMENTS

LU    90188    * 12/1998

OTHER PUBLICATIONS

European Search Report dated Oct. 26, 2009, for corresponding European Patent application 07104887.0, noting listed Luxenborg reference, as well as JP 2001-313022, U.S. Publication 2004/0115521 and U.S. Publication 2005/0164079.

Japanese Office action dated Sep. 28, 2010, for corresponding Japanese Patent application 2007-015804.

English machine translation of Japanese Utility Publication No. 58-88774, dated Jun. 16,1983, 4 pages.

English machine translation of Japanese Utility Publication No. 01-119162, dated Aug. 11, 1989, 2 pages.

English translation of Japanese Office action dated Sep. 28, 2010, 5 pages, previously filed in an IDS dated Dec. 13, 2010, for corresponding Japanese Patent application 2007-015804.

Japanese Office action dated Mar. 8, 2011, for corresponding Japanese Patent application 2007-015804.

Patent Abstracts of Japan, and English machine translation of Japanese Publication 2000-021437, listed above, 10 pages.

Patent Abstracts of Japan, and English machine translation of Japanese Publication 2000-215883, listed above, 7 pages.

* cited by examiner

SECONDARY BATTERY AND METHOD OF FABRICATING THE SAME

CROSS-REFERENCE TO RELATED APPLICATIONS

This application claims priority to and the benefit of Korean Patent Application No. 10-2006-0027521, filed on Mar. 27, 2006, in the Korean Intellectual Property Office, the entire content of which is incorporated herein by reference.

BACKGROUND OF THE INVENTION

1. Field of the Invention

The present invention relates to a secondary battery, and more particularly to a secondary battery having an improved electrolyte containment structure.

2. Discussion of Related Art

Secondary batteries are rechargeable as opposed to primary batteries which are not rechargeable. Secondary batteries are used in electronic devices such as cellular phones, laptop computers, and camcorders. Lithium secondary batteries have high energy density unit per weight and supply 3.6 V of power, three times greater than nickel-cadmium batteries or nickel-hydrogen batteries.

Lithium secondary batteries use lithium oxide as a cathode electrode active material and carbon materials as anode electrode active materials. Generally, lithium secondary batteries are classified as liquid electrolyte batteries (lithium ion batteries) and high molecule electrolyte batteries (lithium polymer batteries) depending on the type of electrolyte used. Also, lithium secondary batteries may also be classified by their housing, such as cylinder types, square types, and pouch types.

FIG. 1 shows a sectional view of a conventional square type secondary battery 10. As illustrated in FIG. 1, the secondary battery 10 includes a can 11 housing an electrode assembly 12, and a cap assembly 20 sealing the can 11.

The electrode assembly 12 includes a cathode electrode plate 13, a separator 14 and an anode electrode plate 15. A cathode electrode tap 16 and an anode electrode tap 17 protrude from the cathode electrode plate 13 and the anode electrode plate 15, respectively.

The cap assembly 20 includes a cap plate 21 coupled with the can 11, an anode terminal 23 insulated from the cap plate 21 by a gasket 22, an insulating plate 24 on an interior-facing surface of the cap plate 21, and a terminal plate 25 electrically connected to the anode terminal 23. The cathode electrode tap 16 is electrically connected to the cap plate 21 and the anode electrode tap 17 is electrically connected to the anode terminal 23 through the terminal plate 25. Additionally, an electrolyte injection hole 26 providing a path through which electrolyte may be injected into the can 11 is formed on the cap plate 21.

FIG. 2A shows an electrolyte injection hole before it has been sealed and FIG. 2B shows an electrolyte injection hole of FIG. 2A after it has been sealed. As illustrated in FIGS. 2A and 2B, the electrolyte injection hole 26 is formed in the cap plate 21 with a taper 28. An aluminum ball 27 is placed on the taper 28 to seal the electrolyte injection hole 26 after electrolyte has been injected into the can 11. The ball 27 is compressed into the electrolyte injection hole 26 by a pressure device such as a press 1. The ball 27 is welded by the laser welding to form a weld 29 and seal the electrolyte injection hole 26.

However, the configuration of the taper 28 is such that the ball 27 does not always precisely and entirely seal the electrolyte injection hole 26 when the ball is pressed into the hole. Accordingly, electrolyte may leak from the can as indicated by the arrows in FIG. 2B, causing sparking or a potential explosion hazard.

SUMMARY OF THE INVENTION

To achieve the purpose of the present invention according to the one side of the secondary battery, the electrode assembly in good order of a cathode electrode plate, a separator, and an anode electrode plate is including; a can including a electrode assembly; a terminal union and an electrolyte injection hole formed in a cap plate; coupled with an electrode terminal through the terminal union; the gasket insulated the electrode terminal with settling between the electrode terminal and the cap plate; and the plug sealed the electrolyte injection hole with pressure to the electrolyte injection hole of cap plate; the periphery of the plug coated with synthetic material.

By other sides of the secondary battery according to the present invention, the secondary battery is including a cathode electrode plate, a separator, and an anode electrode plate; a can including an electrode assembly and an electrolyte; the electrolyte injection hole formed in the one side of a cap plate with closing the opened part of the can; and the plug prevents the electrolyte injection hole of a cap plate; including the film of elasticity material between the plug and the electrolyte injection hole.

Also, the manufacture method of the secondary battery according to the present invention is including the forming step of an electrode assembly comprising the cathode electrode plate, a separator, and an anode electrode plate; the step of the electrode assembly applied to the opened part of a can and the cap assembly including the cap plate formed the electrolyte injection hole in one side is connecting with the opened part of a can; the step of forming the film to the electrolyte injection hole; the step that the electrolyte pour into the inner side of the can through the electrolyte injection hole formed the film; and the step of sealing the electrolyte injection hole by pressing the ball to the electrolyte injection hole formed the film.

DETAILED DESCRIPTION

Figure 1:
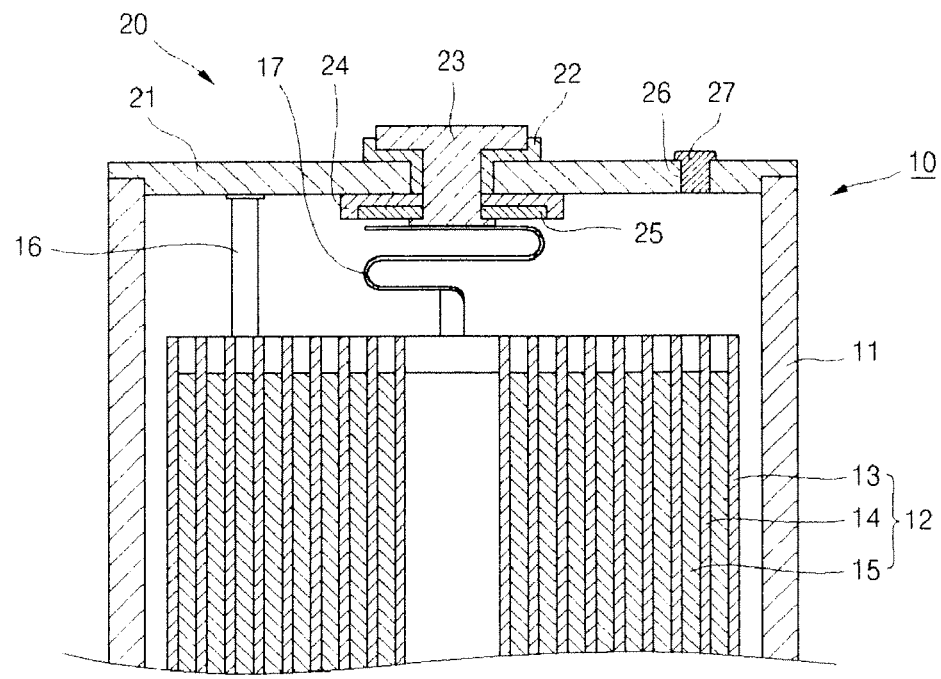
FIG. 1 is a sectional view of a portion of a conventional secondary battery.
Figure 2A:
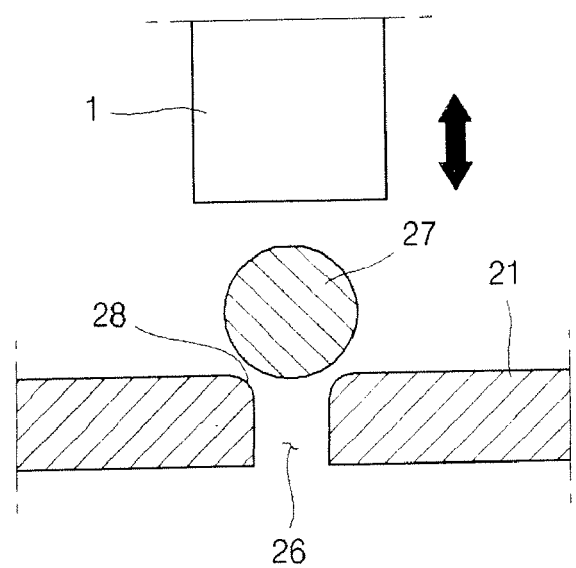
FIGS. 2A and 2B are sectional views of an electrolyte injection hole of a conventional secondary battery before and after the electrolyte injection hole is sealed by an aluminum ball, respectively.
Figure 2B:
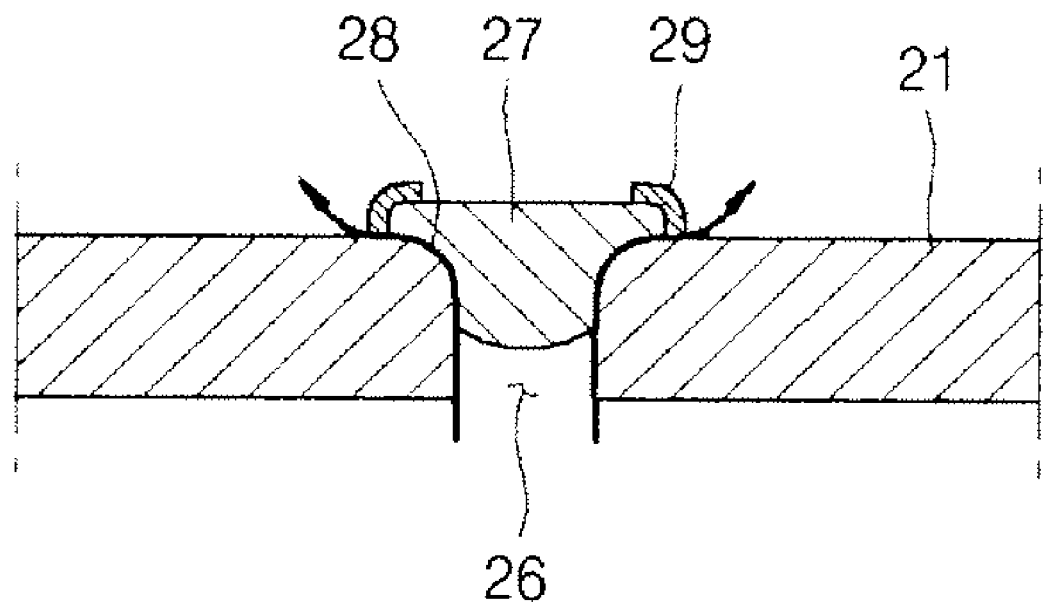
Figure 3:
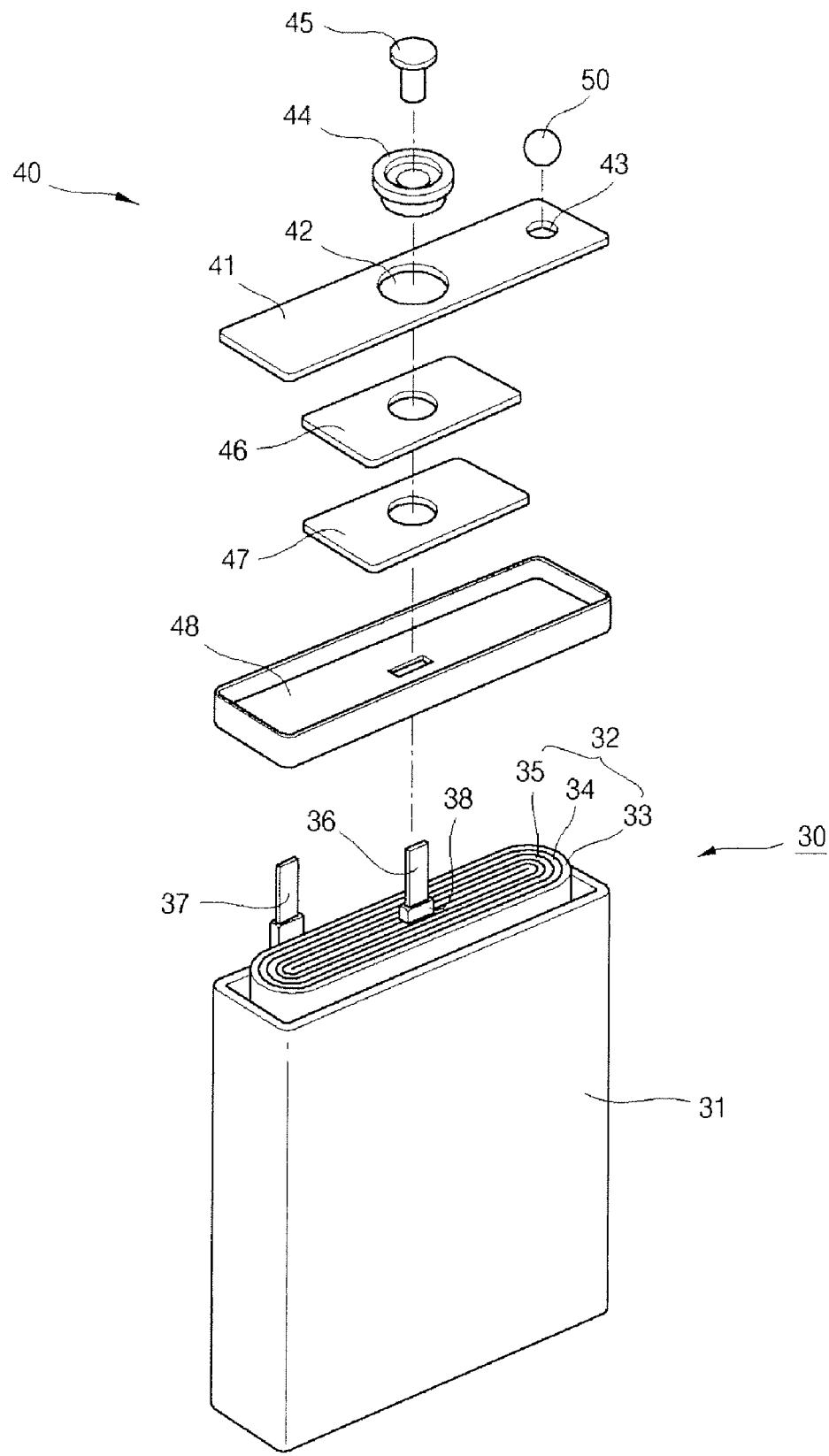
FIG. 3 is exploded perspective view of an exemplary embodiment of a secondary battery in accordance with the present invention.

As illustrated in FIG. 3, an exemplary embodiment of a secondary battery 30 includes a can 31 housing an electrode assembly 32, and a cap assembly 40 sealing the can 31. The can 31 may have a generally hexahedronal shape and may act as an electrode terminal.

The electrode assembly 32 includes a cathode electrode plate 33, a separator 34, and an anode electrode plate 35 wound in a jelly-roll configuration. Generally, the cathode electrode plate 33 includes an aluminum film cathode electrode collector coated on both sides with lithium oxide and the anode electrode plate 34 includes an aluminum film coated on both sides with a carbon material.

A cathode electrode tap 37 and an anode electrode tap 36 protrude from the cathode electrode plate 33 and the anode electrode plate 35, respectively. The cathode electrode tap 37 and the anode electrode tap 36 can be attached to the cathode electrode collector and the anode electrode collector, respectively, by welding. Additionally, the cathode and anode electrode collectors 36, 37 may be wrapped with insulating tape 38 to prevent a short circuit between the cathode electrode plate 33 and the anode electrode plate 35.

The cap assembly 40 includes a cap plate 41, an insulating plate 46 attached to an interior-facing surface of the cap plate 41, and a terminal plate 47 attached to an interior-facing surface of the insulating plate 46.

An anode terminal 45 is inserted through the cap plate 41 and the insulating plate 46 and is electrically connected to the terminal plate 47. A gasket 44 surrounding the anode terminal 45 insulates the anode terminal from the cap plate 41. An insulating case 48 may be attached between the cap assembly 40 and the electrode assembly 32.

The cathode electrode tap 37 may be attached to the cap plate 41 by welding, and the anode electrode tap 36 may be electrically coupled to the anode terminal 45 by being welded to the terminal plate 47. However, the polarity of the electrodes may also be reversed.

Figure 4:
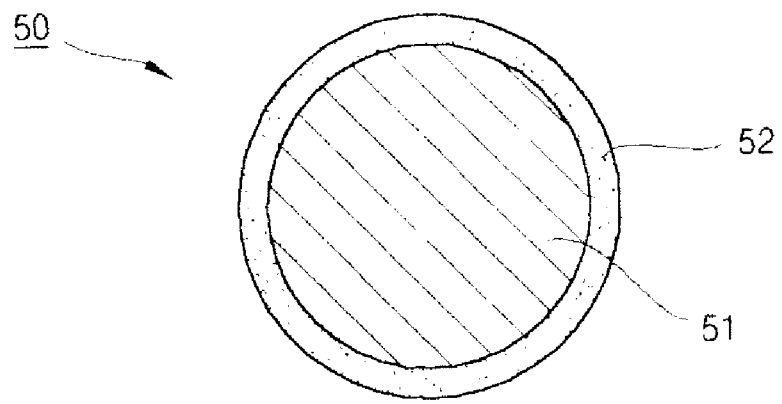
FIG. 4 is a sectional view of an exemplary embodiment of a plug in accordance with the present invention.

An electrolyte injection hole 43 allowing an electrolyte to be injected into the can 11 is located on the cap plate 41, the electrolyte injection hole 43 being sealed by a plug 50. As shown in FIG. 4, the plug 50 may include a ball 51 and a resin 52 coated on the periphery of the ball 51. The plug 50 may also have a pin configuration. In one exemplary embodiment, the ball 51 is made from aluminum, an aluminum alloy, or stainless steel.

In another exemplary embodiment, the resin 52 is fast dry cement resin, and specifically, epoxy resin. The epoxy resin may be mixed with a hardener to provide uniform hardening of the resin. The amount and type of hardener used may vary resulting in various viscosities, hardening temperatures, hardening times of the resin.

Figure 5:
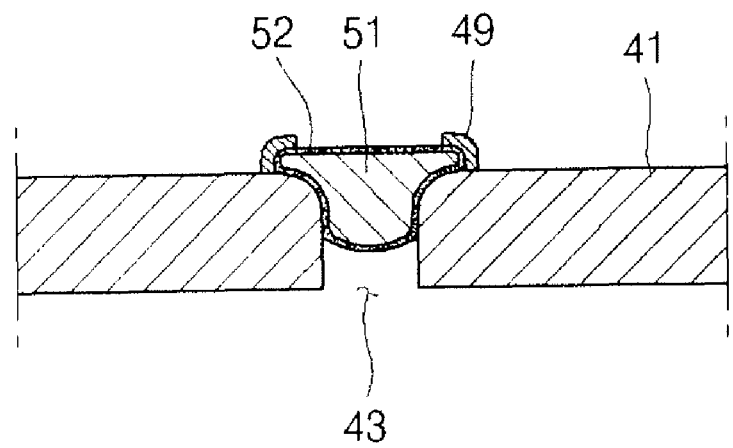
FIG. 5 is a sectional view of a sealed electrolyte injection hole using the plug of FIG. 4.

The sealing of the electrolyte injection hole 43 by the plug 50 will be described with reference to FIG. 5. The plug 50 is placed onto the electrolyte injection hole 43 and compressed into the hole. The periphery of the plug 50 is laser welded forming a weld 49 adjacent an upper edge of the plug. The resin coated on the periphery of the plug 50 rapidly solidifies, seals the plug to the cap plate and helps to form a better seal between the plug and the cap plate 21, thus preventing electrolyte from leaking through the electrolyte injection hole 43.

Figure 6:
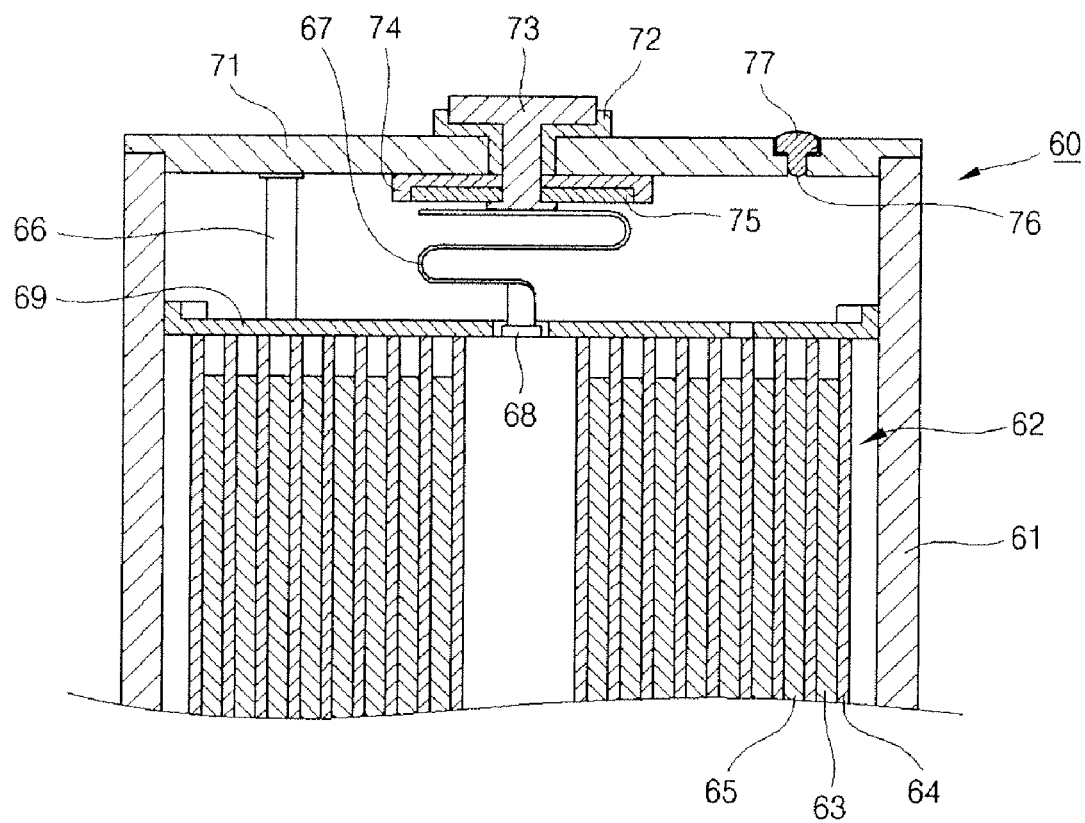
FIG. 6 is a sectional view of a portion of an exemplary secondary battery in accordance with the present invention.
Figure 7:
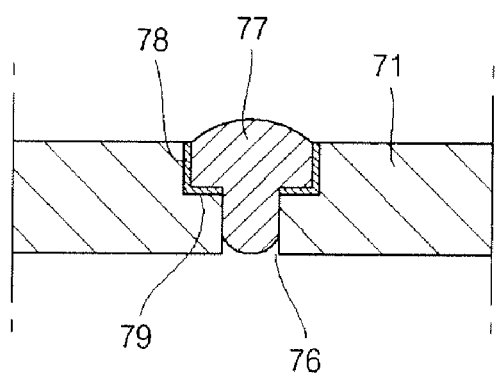
FIG. 7 is a sectional view of an electrolyte injection hole of the secondary battery of the FIG. 6.

Another exemplary embodiment of a secondary battery of the present invention will be described with reference to FIGS. 6 and 7. A secondary battery 60 includes a can 61 housing an electrode assembly 62, and a cap assembly sealing the can. The can 61 may be, for example, aluminum, an aluminum alloy, or iron, may be hexahedronally shaped and may act as an electrode terminal. The cathode electrode plate 63 and the anode electrode plate 65 may be substantially similar to the cathode and anode plates described above.

The separator 64 may be, for example, polyethylene, polypropylene, or a copolymer of polyethylene and polypropylene. In one exemplary embodiment, the separator 64 may be wider than the cathode electrode plate 63 and the anode electrode plate 65 to prevent a short circuit between the cathode electrode plate 63 and the anode electrode plate 65.

The cap plate 71 may be a flat type having an opening through which the electrode assembly 62 may be inserted. A gasket 72 may insulate the electrode terminal 73 from the cap plate 71. An insulating plate 74 may be attached to an interior-facing surface of the cap plate and a terminal plate 75 may be attached to an interior-facing surface of the insulating plate 74. The electrode terminal 73 may be electrically coupled with the terminal plate 75 through an opening in the insulating plate 74. The cathode electrode tap 66 may be welded to the cap plate 71 and the anode electrode tap 67 may be welded to the electrode terminal 73. An insulating case 69 may be located between the electrode assembly 62 and the cap assembly 60 to insulate the electrode assembly from the cap assembly. In one exemplary embodiment, the insulating case 69 may include a high molecule resin, for example, polypropylene.

An electrolyte injection hole 76 is formed in the cap plate 71 having a stepped configuration in which an upper hole portion has a larger diameter than a lower hole portion. A plug 77 is used to seal the electrolyte injection hole 76 by being compressed into the electrolyte injection hole. With reference to FIG. 7, the electrolyte injection hole 76 includes a film 78 formed on the upper hole portion, including a step portion 79. In one exemplary embodiment, the film 78 is formed by drying resin or a rubber liquid solvent on a surface of the electrolyte injection hole 76. Exemplary resins may include fluorine resin or polyolefin resin, and exemplary rubber liquid solvents may include fluorine rubber, butadiend rubber, or Isobutylene-Isoprene rubber.

An exemplary manufacturing method of a secondary battery of the present invention is described with reference to FIG. 8. First, the electrode assembly including the cathode electrode, the separator and the anode electrode is formed into a jelly-roll configuration (S1). Then, the electrode assembly is inserted into the can (S2). The cap plate is then welded to the can to seal the can (S3) and electrolyte is injected through the electrolyte injection hole (S4). The electrolyte injection hole is then sealed with a plug (S5).

Figure 8:
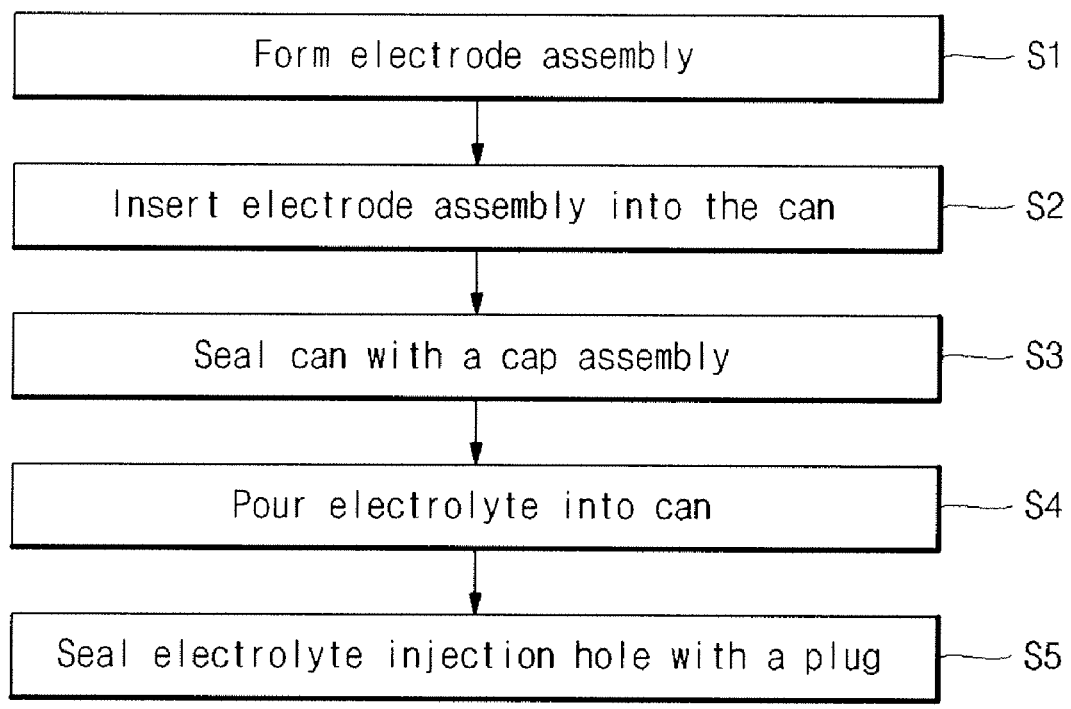
FIG. 8 is a flow chart of an exemplary manufacturing method of a secondary battery in accordance with the present invention.
Figure 9A:
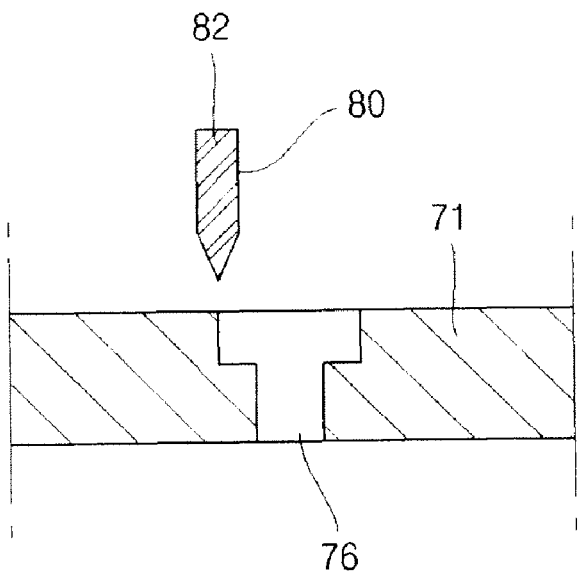
FIGS. 9A, 9B, 9C, 9D and 9E are sectional views of an electrolyte injection hole being sealed by the manufacturing method of FIG. 8.
Figure 9B:
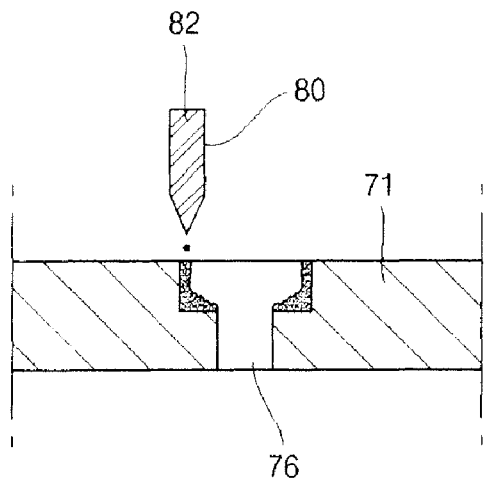
Figure 9C:
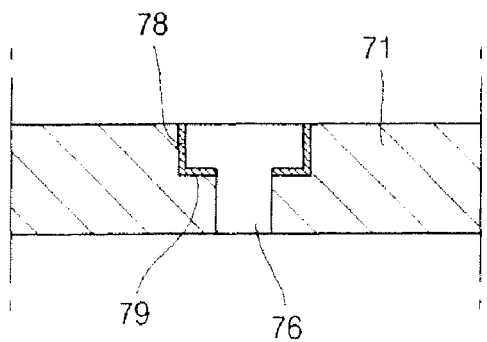
Figure 9D:
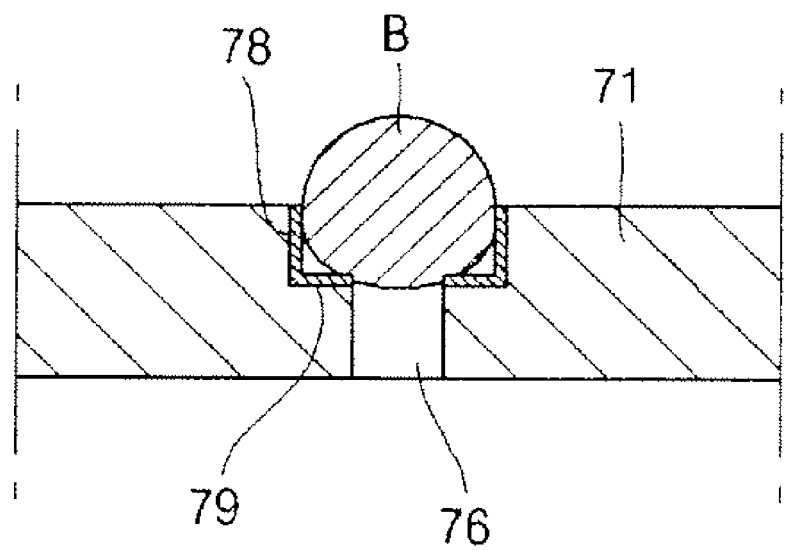
Figure 9E:
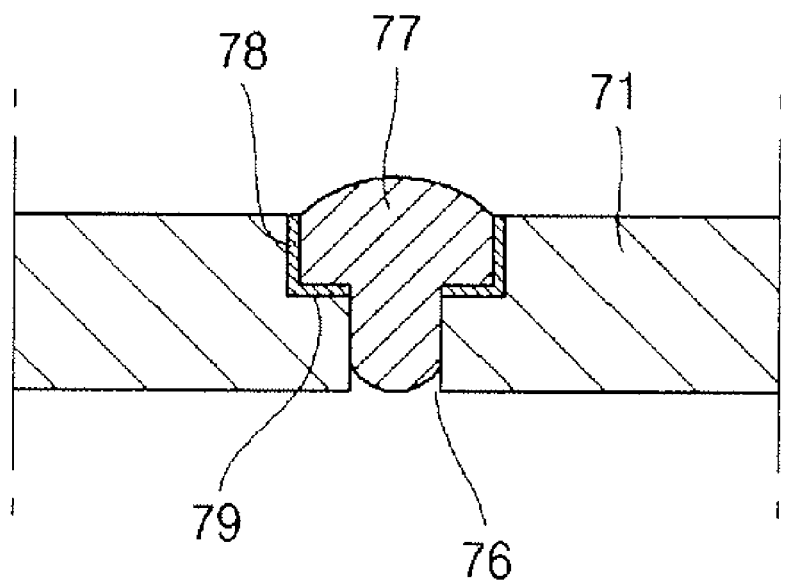

The steps described with reference to FIG. 8 are illustrated in more detail with reference to FIGS. 9A to 9E. As illustrated in FIG. 9A, a loader 80 including a load 82 is prepared and placed adjacent to an upper hole portion of the electrolyte injection hole 76. As illustrated in FIGS. 9B and 9C, the load 82, for example, liquid solvent, is ejected from the loader 80 into the electrolyte injection hole 76 to coat an upper hole portion of the electrolyte injection hole. Next, as illustrated in FIG. 9D, the liquid solvent is dried to form a film on the upper hole portion of the electrolyte injection hole 76, including the step portion 79. After electrolyte has been injected into the can, a ball (B) having the same or larger diameter than the electrolyte injection hole 76 is placed on the electrolyte injection hole and compressed. As illustrated in 9E, the electrolyte injection hole 76 is sealed by compressing the plug into the electrolyte injection hole 76. Accordingly, the method of sealing the electrolyte injection hole 76 described above may prevent electrolyte from leaking.

As described above, the secondary battery according to exemplary embodiments of the present invention allows a sufficient seal to be formed between the plug and the electrolyte injection hole during welding of the plug to the cap plate, thus improving the sealing capability of the plug. Specifically, an elastic film such as resin and/or rubber coated on the plug and/or the electrolyte injection hole reduces the likelihood of electrolyte leaking through the plug. Further, use of a resin on the electrolyte injection hole may eliminate the need for welding the plug to the cap plate, thus increasing the manufacturing efficiency of the secondary battery.

The present invention is not limited to the exemplary embodiment described herein. Rather, modifications apparent to one of skill in the art may be made within the scope of the invention claimed in the appended claims.

What is claimed is:

1. A secondary battery comprising;
an electrode assembly;
a can having an opening at one end of the can, the can housing the electrode assembly;
a cap plate sealing the opening, the cap plate having an electrolyte injection hole for inserting electrolyte into the can;
an electrode terminal coupled to the cap plate for providing an electrical connection between the electrode terminal and the electrode assembly;
a gasket between the electrode terminal and the cap plate for insulating the electrode terminal from the cap plate; and
a plug for sealing the electrolyte injection hole,
wherein the plug comprises an interior metal portion and an elastic film surrounding the interior metal portion such that the plug contacts the electrolyte injection hole only via the elastic film.

2. The secondary battery of claim 1, wherein the elastic film is a resin.

3. The secondary battery of claim 2, wherein the resin is a hardening resin.

4. The secondary battery of claim 3, wherein the hardening resin is an epoxy resin.

5. The secondary battery of claim 1, wherein the metal plug is a ball or a pin.

6. The secondary battery of claim 5, wherein the metal plug comprises aluminum, aluminum alloy, or stainless steel.

7. A secondary battery comprising;
an electrode assembly;
a can having an opening at one end of the can, the can housing the electrode assembly;
a cap plate for sealing the opening, the cap plate including an electrolyte injection hole for inserting electrolyte into the can; and
a metal plug having an engaging portion contacting an inner wall of the electrolyte injection hole for sealing the electrolyte injection hole;
wherein an elastic film is between the electrolyte injection hole and the engaging portion of the metal plug within the electrolyte injection hole.

8. The secondary battery of claim 7,
wherein the electrolyte injection hole has a stepped configuration such that an upper hole portion of the stepped configuration for inputting electrolyte into the can has a diameter larger than a diameter of a lower hole portion adjacent to the upper hole portion; and
wherein the elastic film coats wall surfaces of the upper hole portion.

9. The secondary battery of claim 7, wherein the elastic film is fluorine resin or polyolefin resin.

10. The secondary battery of claim 7, wherein the elastic film comprises fluorine rubber, Butadiend rubber, or Isobutylene-Isoprene rubber.

11. A method of manufacturing a secondary battery, the secondary battery including a can having an opening at one end of the can, the method comprising;
providing an electrode assembly;
inserting the electrode assembly into the can through the opening;
sealing the opening with a cap plate, the cap plate having an electrolyte injection hole for inserting electrolyte into the can,
coating the electrolyte injection hole with an elastic film;
injecting electrolyte into the can through the electrolyte injection hole; and
compressing a metal plug having an engaging portion for contacting an inner wall of the electrolyte injection hole to seal the electrolyte injection hole such that the engaging portion of the metal plug contacts the elastic film within the electrolyte injection hole.

12. The method of claim 11, wherein the electrolyte injection hole further comprises a stepped configuration such that an upper hole portion of the stepped configuration for inputting electrolyte into the can has a diameter larger than a diameter of a lower hole portion adjacent to the upper hole portion, and wherein coating the electrolyte injection hole with an elastic film further comprises:
preparing a loader with a liquid solvent;
aiming the loader at the upper hole portion;
injecting the liquid solvent onto an interior surface of the cap plate defining the upper hole portion while moving the loader around the electrolyte injection hole; and
drying the liquid solvent to form the elastic film.

13. A method of manufacturing a secondary battery, the secondary battery including a can having an opening at one end of the can, the method comprising:
providing an electrode assembly;
inserting the electrode assembly into the can through the opening;
sealing the opening with a cap plate, the cap plate having an electrolyte injection hole for inserting electrolyte into the can,
injecting electrolyte into the can through the electrolyte injection hole; and
compressing a metal plug to seal the electrolyte injection hole;
wherein the metal plug includes an engaging portion contacting an inner wall of the electrolyte injection hole, the engaging portion having a resin covering a surface of the engaging portion.

14. The method of claim 13, wherein the resin is a hardening resin.

15. The method of claim 14, wherein the hardening resin is an epoxy resin.

16. The method of claim 13, wherein the metal plug comprises aluminum, aluminum alloy or stainless steel.

* * * * *

UNITED STATES PATENT AND TRADEMARK OFFICE
CERTIFICATE OF CORRECTION

| | | |
|---|---|---|
| PATENT NO. | : 8,021,774 B2 | Page 1 of 1 |
| APPLICATION NO. | : 11/690753 | |
| DATED | : September 20, 2011 | |
| INVENTOR(S) | : Soonki Woo | |

It is certified that error appears in the above-identified patent and that said Letters Patent is hereby corrected as shown below:

In the Claims

Column 5, Claim 1, line 16.     Delete "comprising;"
                                Insert -- comprising: --

Column 5, Claim 7, line 44.     Delete "comprising;"
                                Insert -- comprising: --

Column 6, Claim 11, line 10.    Delete "comprising;"
                                Insert -- comprising: --

Column 6, Claim 11, line 16.    Delete "can,"
                                Insert -- can; --

Column 6, Claim 13, line 46.    Delete "can,"
                                Insert -- can; --

Signed and Sealed this
Thirty-first Day of July, 2012

David J. Kappos
*Director of the United States Patent and Trademark Office*